March 24, 1964 B. LYMAN ET AL 3,125,951

PRINTING DEVICE

Filed April 14, 1961 3 Sheets-Sheet 1

INVENTORS
Brooks Lyman
Newton C. Coleman
BY
William W. Holtow Jr.
ATTORNEY

March 24, 1964 B. LYMAN ET AL 3,125,951

PRINTING DEVICE

Filed April 14, 1961 3 Sheets-Sheet 2

INVENTORS
Brooks Lyman
Newton C. Coleman

BY William W. Holtow Jr.
ATTORNEY

INVENTORS
Brooks Lyman
Newton C. Coleman
BY William W. Holloway Jr.
ATTORNEY

United States Patent Office 3,125,951

Patented Mar. 24, 1964

3,125,951

PRINTING DEVICE

Brooks Lyman, Pound Ridge, and Newton C. Coleman, Hartsdale, N.Y., assignors to Pitney-Bowes, Inc., Stamford, Conn., a corporation of Delaware Filed Apr. 14, 1961, Ser. No. 103,043
1 Claim. (Cl. 101—250)

This invention relates to a printing device, and more particularly, to a low cost printing device capable of printing data on documents with a high degree of print quality.

The term "print quality" as used herein is intended to refer to the accuracy of reproduction of printing type faces.

With the advent of high-speed data-reading equipment such as magnetic character readers, there has arisen a need for a relatively low cost device for consistently printing data with sufficiently good print quality to enable reliable recognition by the data-reading equipment. For example, with so-called credit card systems, it would be advantageous to provide each credit-issuing place of business (such as a restaurant, hotel, etc.) with a printing device capable of printing data identifying the credit card holder and the amount of credit extended for each transaction; this with the requisite print quality for reliable reading by high-speed data-reading equipment. Preferably, one of such printing devices would be provided at each "point of sale." That is, one of the printing devices would be provided at each set of gasoline pumps of a gasoline station and at each counter of a department store. Such a printing device must be low in cost, of course, to justify its use at each place of business, and this is all the more so to justify its use at each "point of sale."

It is accordingly an object of this invention to provide a printing device capable of producing printed characters that are within the printing tolerances required for magnetic character reading (such, for example, as those set forth in the specifications for the well known E-13B font of the American Bankers Association). Further objects are to provide such a printing device which is economical to produce, relatively maintenance free, and simple in design and operation.

Further objects and advantages will become apparent as the description proceeds.

Several embodiments of the invention are shown in the accompanying drawing wherein.

Figures 1, 4:
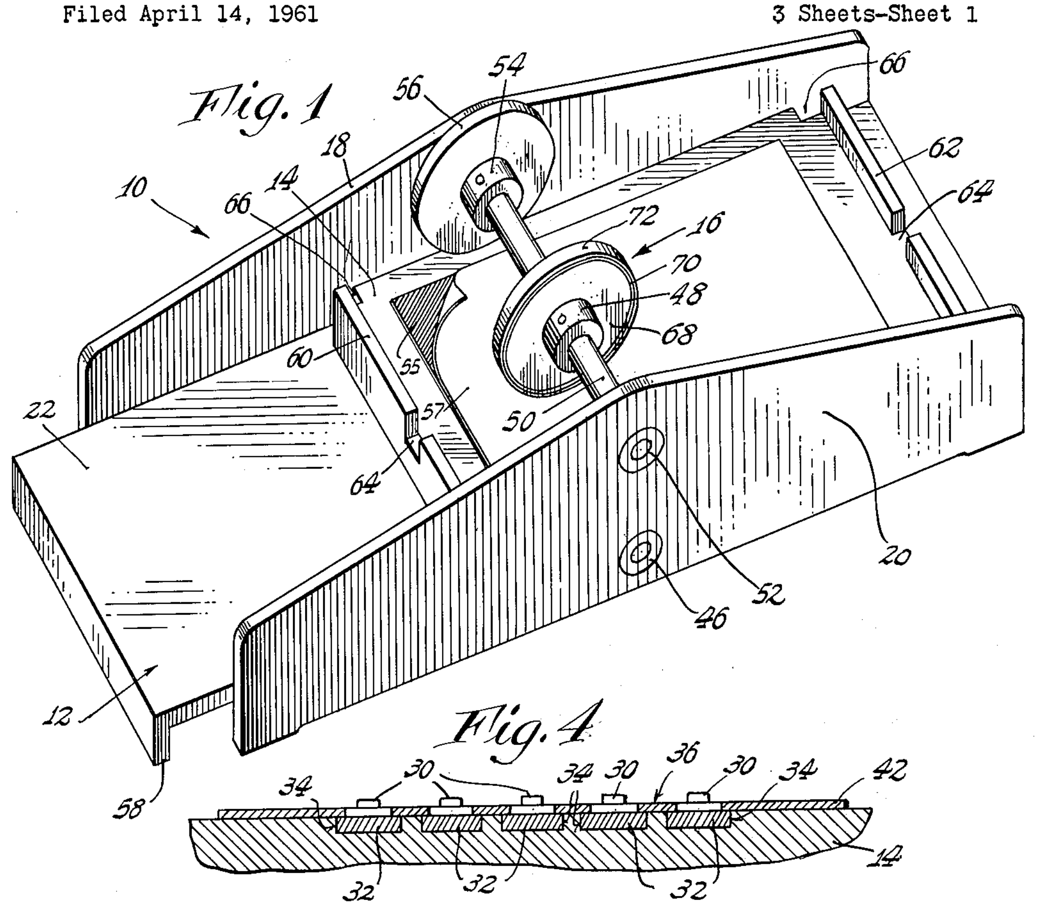
FIG. 1 is a perspective view of a printing device according to a first embodiment of the present invention.
FIG. 4 is a fragmentary elevational view on an enlarged scale and taken in section along line 4—4 in FIG. 2.
Figure 2:
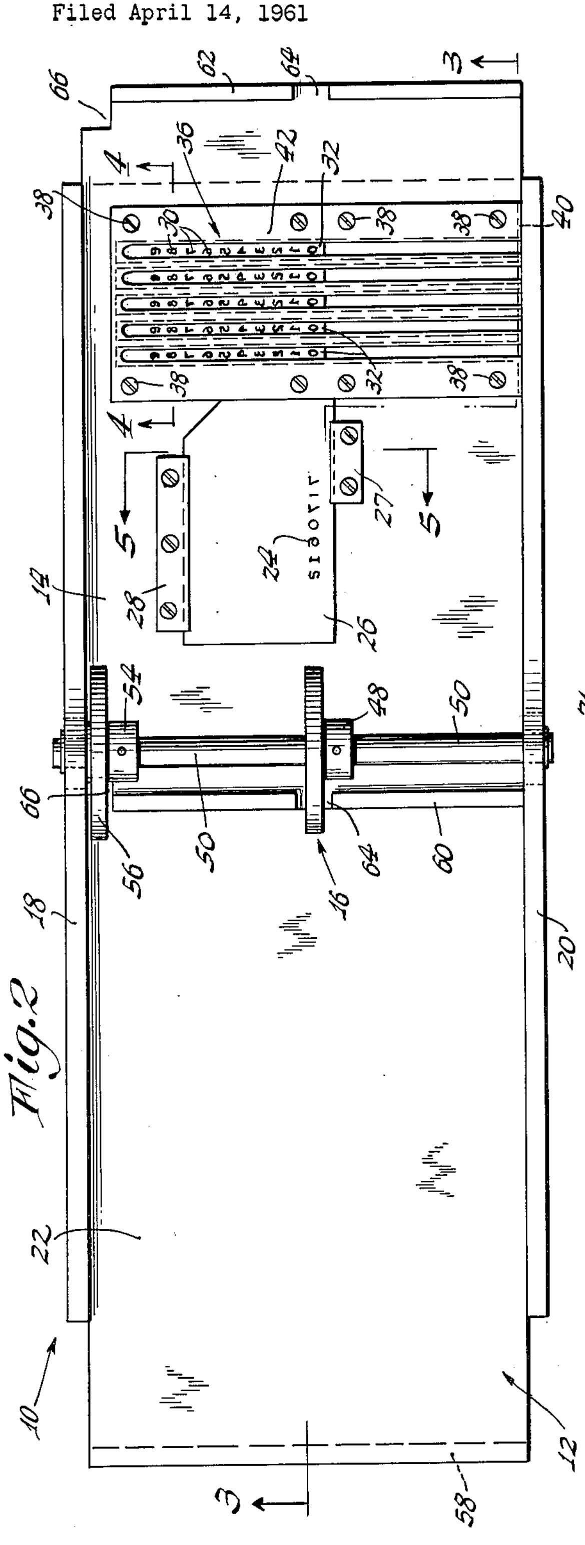
FIG. 2 is a top plan view thereof.
Figure 3:
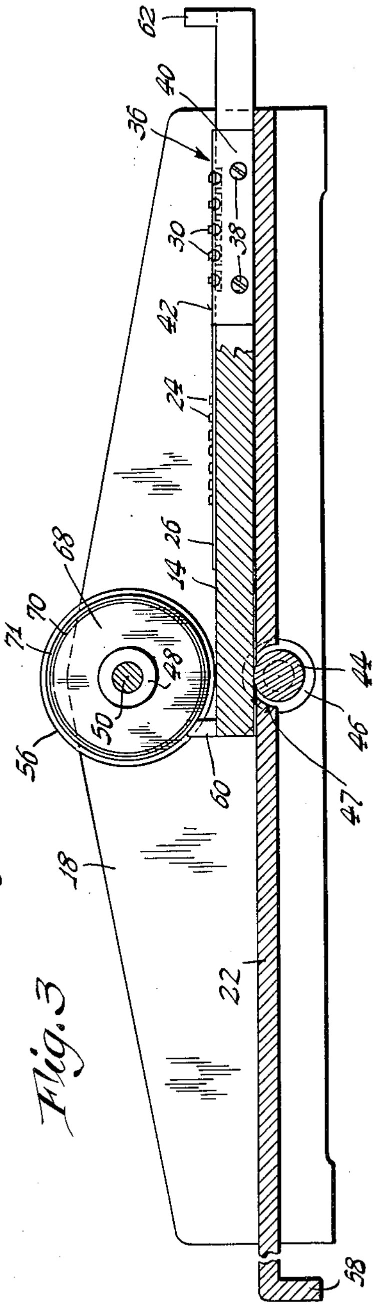
FIG. 3 is a side elevational view taken in section along line 3—3 in FIG. 2.

Referring to FIGS. 1, 2 and 3, a printing device embodying the present invention is generally indicated by the reference numeral 10. This device generally includes a base 12, a carriage 14 and a platen roller 16. The base

12 is formed by a pair of upstanding spaced side walls 18 and 20 fixed to a bed 22. The upper surface of the bed 22 is flat, as is the lower surface of the carriage 14. The carriage 14 is slidable along the bed 22 through a straight path; lateral displacement of the carriage being prevented by the side walls 18, 20 which thereby act as guide means.

Figure 5:
FIG. 5 is a fragmentary elevational view on an enlarged scale and taken in section along line 5—5 in FIG. 2.

Mounted on the carriage 14 are any practical number of type faces 24, each of which is disposed in alignment with the platen roller 16. The type faces 24 are integral with, project above and may be formed of the same material as the remainder of a metal or plastic credit or charge plate 26. The plate 26 is removably retained on the upper surface of the carriage 14 as by two metal straps 27, 28, each of which is secured by screws to the carriage in overhanging relation to the plate 26 as exemplified in FIG. 5. The plate 26 is inserted between the straps 27 and 28 by sliding it to the right (as viewed in FIG. 2) until the right-hand edge of the plate 26 engages the left-hand edge of a plate 36 later to be described.

Also mounted on the carriage 14 are any practical number of rows of type faces 30. The type faces 30 of each row are integral with the remainder of a bar 32. Each bar 32 extends and is slidable in a direction perpendicular to the path of slidable movement of the carriage 14 whereby any one of the type faces 30 of each row can be brought into alignment with the platen roller 16. More particularly, each bar 32 is slidable in an elongated recess 34 provided by the carriage 14, as best shown in FIG. 4. An L-shaped slotted plate 36 is secured over the recessed portion of the carriage 14 by means of flush-head screws 38 to retain the bars 32 within the respective recesses. The shorter leg 40 of the L-shaped plate 36 is disposed within a recess provided by the side of the carriage 14 so that the outer surface of the leg 40 lies flush with the remainder of the side surface of the printing member. The longer leg 42 is disposed on the upper surface of the carriage 14 as shown in FIG. 4 to provide for engagement of the right-hand edge of the credit or charge plate 26 with the left-hand edge of the plate 36, as previously described. A slight interference fit with each bar 32 is provided by the bottom of each recess 34 and the lower surface of the portions of the plate 36 which overhang the respective recess whereby each bar 32 will be yieldably retained by friction in any position to which it is set along its recess. Obviously, each type bar 32 can be detented for yieldable retention in any one of the ten "0" through "9" positions to which it may be set.

A roller 44 having an anti-friction bearing 46 at each end is supported by the side walls 18, 20 adjacent an arcuate slot 47 (see FIG. 3) extending across the entire width of the bed. The roller 44 is rotatable about an axis lying perpendicular to the straight path of movement of the carriage 14. The uppermost extremity of the outer peripheral surface of the roller 44 lies at a location slightly above the upper surface of the bed 22 to provide line rolling contact of the roller 44 with the lower surface of the carriage 14 at this location.

The platen roller 16 is integral with a hub 48 which is pinned to a shaft 50, the latter having an anti-friction bearing 52 at each end for support by the side walls 18, 20. Also fixed on the shaft 50 by means of a hub 54 pinned to this shaft, is a wheel or roller 56 integral with the hub 54. The roller 56 is formed of resilient frictional material such, for example, as a medium-durometer elastomer. The outer peripheral surface of the roller 56 is in driven engagement with the upper surface of the carriage 14 so that the platen roller 16 is rotated, when the carriage is moved along the bed 22, not only by the drive from the moving aligned type faces 24, 30 (and a document and carbon sheet therebetween) to the platen roller but also by the drive through the roller 56 and shaft 50 to the platen roller.

In operation, a carbon sheet 55 is placed carbon-side-up over the type faces 24, 30 that are aligned with the platen roller 16, and a document 57 to be printed is placed on the carbon sheet, all as shown in FIG. 1. The carriage 14 is then moved along the bed 22 to move the aligned type faces 24, 30 past the platen roller 16. The pressure developed between the document 57 and the carbon sheet 55 by the aligned type faces and the platen roller results in a deposit of the carbon material on the document as a mirror-image printing of the aligned type faces. In so moving the carriage 14, the operator may, with one hand, grasp a downwardly extending grip 58 fixed to one end of the bed 22 and push or pull the carriage along the bed 22 by grasping one of the grips 60, 62 fixed at each end of the carriage with the other hand. As best shown in FIGS. 1 and 2, the grips 60 and 62 are cut-away at 64 and 66 to avoid interference with the rollers 16 and 56.

Among the features of the present invention which contribute to the high degree of printing quality capable of being produced, is the one that the carriage 14 is backed-up during printing solely along the line of rolling contact with the roller 44. It follows that the back-up pressure exerted against the underside of the carriage 14 during printing is concentrated directly beneath the printing line thereby providing for concentrated and uniform printing pressure. This line of rolling contact arrangement also eliminates the ill effects due to irregularities in the lower surface of the carriage (except for any that might be directly beneath a type face) and in the upper surface of the bed 22. Since the line of rolling contact between the roller 44 and the lower surface of the carriage 14 is located above the upper surface of the bed 22, practically all friction between the bed and the carriage is eliminated whereby the force required to move the carriage along the bed is greatly reduced. This line of rolling contact construction does permit a limited amount of pivotal movement of the printing member 14 about this line of contact. However, (1) the smaller the distance the line of rolling contact extends above the upper surface of the bed 22, (2) the greater the length of the printing member and (3) the smaller the thickness of the printing member, the smaller and the less significant will be the arc of possible movement of the type faces at the printing line due to this pivotal movement. With this line of rolling contact construction, it is a simple matter, well within the scope of mass production techniques, to confine the maximum movement of the type faces about this line of contact to less than 0.001 of an inch. Also, to align the axes of rotation of the rollers 16 and 56 is a much more simple matter than it would be to adjust mating surfaces of a bed and carriage (where the carriage is movable to print), or to adjust the path of movement of the axis of a platen roller or printing roller to a fixed cooperating surface (where the axis of the platen or printing roller is movable to print).

Another factor contributing to the high print quality attainable with the device of this invention is the provision of the wheel or roller 56. The effect of the roller 56 is particularly advantageous, first, from the time the leading edge of each type face being printed first begins to press the carbon sheet and document against the platen roller 16 until the lowermost extremity of the platen roller rides past the leading edge of that type face and, second, from the time the trailing edge of each type face moves past the lowermost extremity of the platen roller until the trailing edge of that type face stops pressing the carbon sheet and document against the platen roller. It is during these time intervals that the printing pressure exerted by the type face is changing, and this has the effect of correspondingly changing the resistance to movement of the carriage resulting in a tendency for relative movement between the respective type face and the document. However, since the platen roller 16 is driven, not only by movement of the aligned type faces 24, 30 therepast, but by the roller 56 and shaft 50 as well, this change in resistance to movement of the carriage is significantly reduced thereby improving the definition of the leading and trailing edges of the printed characters.

Still another factor contributing to the high degree of print quality is the construction of the platen roller 16. The platen roller is made up of an inner annular body member 68 covered by an annular strip 70 which, in turn, is covered by an annular strip 72. The body member 68 is formed of a rigid material such as steel. The inner annular strip 70 is formed of an elastomeric material having a modulus of elasticity in compression of the order of 1,000 p.s.i. The outer annular strip 72 is formed of a material such as plastic having a modulus of elasticity in compression of the order of 300,000 p.s.i., and is sufficiently thin to flex slightly without permanent deformation under the pressure exerted by the type faces. The combination of the hard outer peripheral surface presented by the platen roller with the flexibility of the outer annular strip 72 and the resiliency of the inner annular strip 70, the latter being backed up by the rigid body member 68, provides for the uniform application of pressure by the type faces against the carbon sheet without such deformation of proper document material as would result in deleterious distortion of the characters being printed. In this regard, slight irregularities in the thickness, for example, of the document being printed, will be accommodated by the flexibility of the platen roller without sacrifice of the hardness of the outer surface of this roller. The thickness of each of the annular strips 84 and 86 as shown in the drawing is exaggerated for the purposes of clarity of illustration.

By using a carbon sheet, the "carbon" material of which contains magnetizable particles, so-called magnetic characters have been printed with a device as particularly described herein, and the print quality was found to be sufficiently high that reliable reading of these characters was accomplished with a high speed magnetic character reader as disclosed and claimed in the copending U.S. application of A. B. Eckert, Jr., Serial No. 20,948, filed April 8, 1960, assigned to the same assignee.

Figures 6, 7, 8:
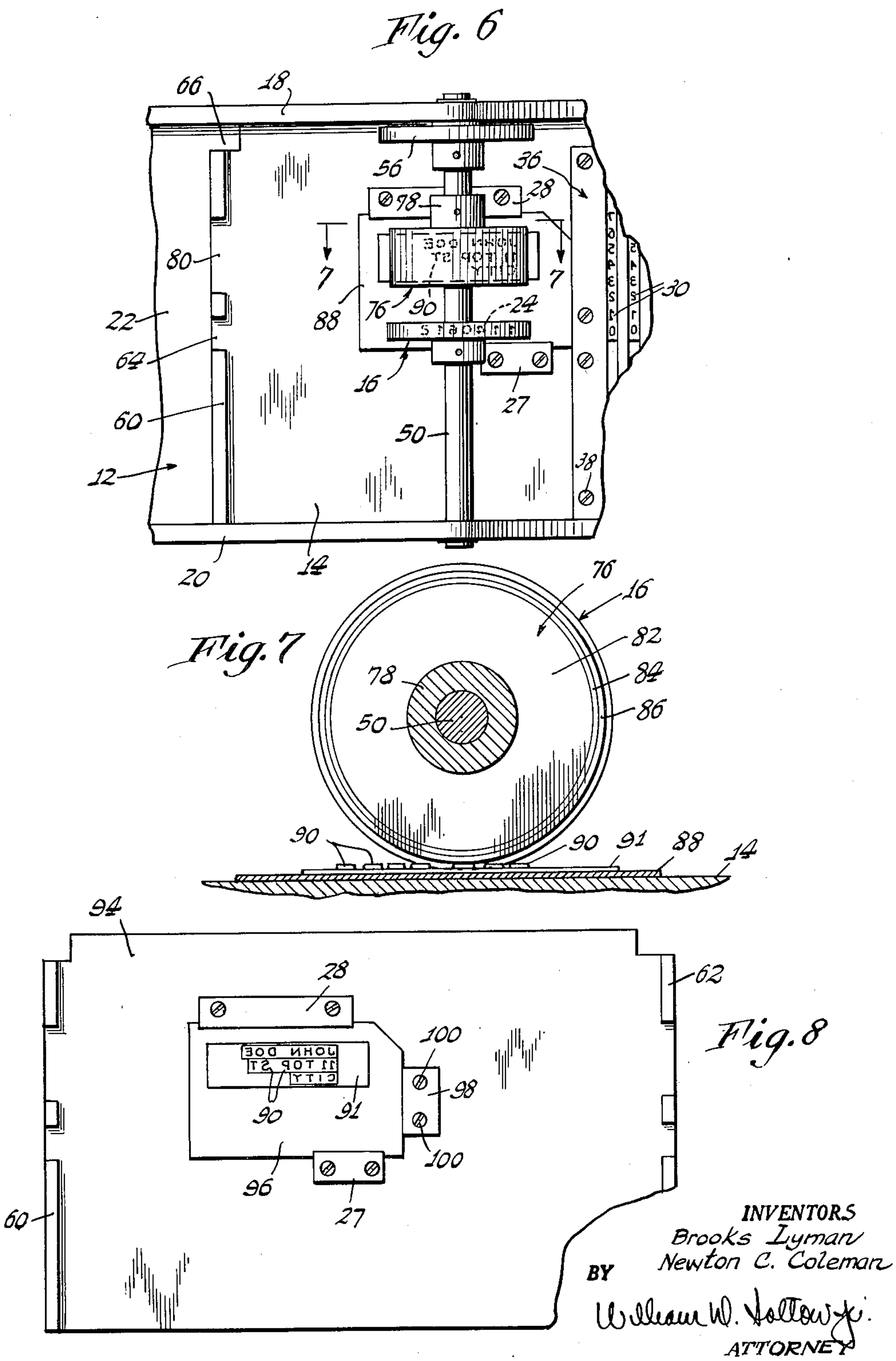
FIG. 6 is a fragmentary top plan view of a printing device according to a second embodiment of the present invention.
FIG. 7 is a fragmentary elevational view taken in section along line 7—7 in FIG. 6.
FIG. 8 is a top plan view of a carriage of a printing device according to a third embodiment of the present invention.

Referring to FIGS. 6 and 7, a second embodiment of the invention is shown by which more than a single line of printing is accomplished during each printing operation. This second embodiment is identical with the first embodiment described above, except as will hereinafter be particularly pointed out. According to the second embodiment, a second platen roller 76 is provided in addition to the platen roller 16. The platen roller 76 is integral with a hub 78 which is pinned to the shaft 50, and the grips 60 and 62 (only one of the latter being shown in FIG. 6) are cut-away at 80 to avoid interference with the platen roller 76.

The platen roller 76 is formed of a body portion 82, an inner annular strip 84 and an outer annular strip 86, all of which are identical with their counterparts of the platen roller 16. Alternatively, the platen roller 76 may be a solid member formed of a suitable plastic material where, as with the embodiment of FIG. 6, the characters to be printed with this platen roller need not exhibit the print quality required for magnetic character reading.

The credit or charge plate 88 according to this second embodiment is identical with the plate 26 of the first embodiment except that it includes one or more additional rows of type faces 90; the latter being aligned with the platen roller 76. The platen roller 76 will, of course, be of a width commensurate with the number of rows of type faces 90. The type faces 90 are integral with a strip 91 which is cemented or otherwise secured to the upper surface of the plate 88.

As can be seen in FIGS. 6 and 7, the radius of the platen roller 16 is greater than that of the platen roller 76. Also, the height of the type faces 90 (above the upper surface of the carriage 14) is greater than that of the type faces 24 and 30. The relationship is such that the radius of the platen roller 16 is greater than the radius of the platen roller 76 by an amount slightly greater than that by which the height of the type faces 90 is greater than the height of the type faces 24 and 30. By virtue of this arrangement, the respective ones of type faces 24 and 90 provided by plate 88 (in alignment with platen roller 16 and platen roller 76) will effect the printing of an impression during each printing operation, as will the ones of type faces 30 that are aligned with platen roller 16, but such will not be the case with any of the type faces 30 that may be aligned with the platen roller 76. The amount by which the radii of platen rollers 16 and 76 differ and the amount by which the heights of type faces 30 and 90 differ, are ordinarily kept to a minimum and are chosen to be just sufficient to provide the necessary clearance between platen roller 76 and any ones of type faces 30 aligned therewith to prevent printing by the latter against the platen roller 76. The amount by which the difference between said radii is greater than the difference between said type face heights is just sufficient to favor printing of characters by the platen roller 16 over printing of characters by the platen roller 76 to the extent that reliable magnetic character reading of the former is ensured while human reading of the latter is not prevented.

A carriage 94 is shown in FIG. 8 which takes the form of a third embodiment of the invention. This embodiment is utilized when none of the characters to be printed are settable, but rather are fixed as determined by the type faces 90 carried by the particular charge or credit plate 96 mounted on the carriage 94. The carriage 94 is identical with the carriage 12 of the above-described first and second embodiments except that all of the structure appurtenant to the settable type faces 30 has been eliminated. Also, to provide a stop for the plate 96 when inserted (to the right as viewed in FIG. 8) between the straps 27 and 28, a strap 98 is secured by flush-head screws 100 to the top of the carriage 94. As with the slotted plate 36 of the first and second embodiments, the upper surface of the strap 98 lies below the printing surfaces of all of the type faces; in this case below the printing surfaces of the type faces 90.

Since many changes can be made in the embodiments of the invention as particularly described and shown herein without departing from the scope of the invention, it is intended that these embodiments be considered as exemplary and that the invention not be limited except as warranted by the following claim.

What is claimed is:

A device for printing data on documents; said device comprising:

a base providing a bed having an upper surface;

a carriage adapted to be supported by said base and having a flat lower surface for movement along the upper surface of said bed and through a fixed straight path;

a back-up roller supported by said base intermediate the ends of the bed for rotation about a first fixed axis extending below and transversely of said straight path;

the uppermost extremity of the outer peripheral surface of said back-up roller lying at a location extending slightly above said upper surface of the bed to provide line rolling contact with said flat lower surface of the carriage at said location as the sole back-up pressure for the carriage;

a shaft;

a first platen roller and a second platen roller mounted on said shaft for rotation about a second axis above and parallel to said first axis;

bearing means mounting said shaft on said base against yielding movement away from said back-up roller;

a plurality of type bars supported by said carriage;

each of said type bars carrying a row of type faces and being settable along a path extending perpendicular to said fixed straight path to bring one of said settable type faces of each of said rows into alignment with said first platen roller;

a plurality of additional type faces supported by said carriage;

said second platen roller being aligned with said additional type faces and with a portion of the path along which the type faces of each of said rows is settable;

whereby when a document and a carbon sheet are placed over said aligned type faces, and the carriage is moved between and past said back-up roller and said platen rollers, an impression of the type faces respectively aligned with said platen rollers is printed on the document;

the radius of said first platen roller being greater than the radius of said second platen roller and the height of said additional type faces being greater than the height of said settable type faces, thereby preventing the printing of an impression on the document of any of the settable type faces then aligned with said second platen roller; and the radius of said first platen roller being greater than the radius of said second platen roller by an amount slightly greater than that by which the height of said additional type faces is greater than the height of said settable type faces, thereby favoring printing of impressions of the settable type faces then aligned with said first platen roller over printing of impressions of the additional type faces aligned with said second platen roller.

References Cited in the file of this patent

UNITED STATES PATENTS

| | | |
|---|---|---|
| 423,153 | Hawkins | Mar. 11, 1890 |
| 746,464 | Cochrane | Dec. 8, 1903 |
| 1,774,272 | Honigmann | Aug. 26, 1930 |
| 1,860,693 | Sheedy et al. | May 21, 1932 |
| 1,997,191 | Hoag | Apr. 9, 1935 |
| 2,061,984 | Rutkoskie | Nov. 24, 1936 |
| 2,694,975 | Garver | Nov. 23, 1954 |
| 2,715,024 | Nydegger et al. | Aug. 9, 1955 |